United States Patent [19]

Udelle

[11] Patent Number: 5,517,945
[45] Date of Patent: May 21, 1996

[54] COMBINED MECHANICALLY ASSISTED ANIMAL AMUSEMENT, GROOMING, AND CLAW SCRATCHING DEVICE

[76] Inventor: Steven D. Udelle, 26414 Barranquilla Ave., Punta Gorda, Fla. 33983

[21] Appl. No.: 366,687

[22] Filed: Dec. 30, 1994

[51] Int. Cl.⁶ .......................... A01K 13/00; A01K 29/00
[52] U.S. Cl. .............................. 119/83; 119/706; 119/707
[58] Field of Search .................... 119/83, 85, 91, 119/157, 707, 711, 706, 702; 446/131, 136, 168, 170

[56] References Cited

U.S. PATENT DOCUMENTS

| | | | |
|---|---|---|---|
| 4,722,299 | 2/1988 | Mohr | 119/29 |
| 4,729,147 | 3/1988 | Armbruster | 15/314 |
| 4,871,340 | 10/1989 | Ross | 446/132 |
| 5,111,131 | 5/1993 | Plyler | 119/87 |
| 5,207,183 | 5/1993 | Praschulk | 119/87 |
| 5,269,261 | 12/1993 | McCance | 119/706 |

Primary Examiner—Todd E. Manahan

[57] ABSTRACT

Combined mechanically assisted animal exercise, amusement, self grooming, and claw scratching stimulator, comprising a circular housing 14, a carpeted platform surface 10, a lure ring 42 comprised of a closed circuit U-shaped trough 23, partially open 22, exposing the interior. A movable ball shaped lure 24 containing a permanent magnet 26 is confined within the U-shaped trough 23. A motorized mechanism concealed within housing 14 includes a motor 30, output shaft 32, magnetic sweep arm 34 mounted to shaft 32, and rotates at a predetermined speed. An accessory lure 44, affixed to spring 46 at top of brush surface 28 provides an additional source of amusement for an animal.

20 Claims, 2 Drawing Sheets

COMBINED MECHANICALLY ASSISTED ANIMAL AMUSEMENT, GROOMING, AND CLAW SCRATCHING DEVICE

FIELD OF THE INVENTION

The present invention relates to animal amusement and self grooming devices, but more particularly to a combination mechanically assisted exercise, amusement, caw scratching, and self grooming device that mechanically rotates a grooming brush and orbits a ball shaped lure simultaneously.

BACKGROUND-DISCUSSION OF THE PRIOR ART

Animal amusement devices have a movable object on, around, or within these devices. An animal is usually shown by demonstration the movable or rolling object in the device, whereby the animal's inherent instinct to attack, or play with a moving object is imminent. However, these objects have to be initially moved by an animal or human hand to begin with, and unfortunately a good device becomes unused for long periods of time, and just occupies space. Stationary self grooming devices do not provide an incentive, or attraction to be used by an animal more frequently, as the animal has to provide all of the motions or efforts to utilize the devices as they were intended. Most animals will remain very appreciative for extended periods of time, when brushes are moved against their bodies by the human hand. Examples of devices more closely associated to the present invention's amusement and exercise concept are U.S. Pat. No. 4,722,299, by Mohr, Feb. 2, 1988, U.S. Pat. No. 5,269,261, by McCance, Dec. 14 1993, both showing a device comprising a ball within a closed loop requiring an animal or human hand to initiate movement of the ball. Examples of devices more closely associated to the present invention's self grooming concept are U.S. Pat. No. 5,207,183, by Praschulk, May 4, 1993, U.S. Pat. No. 5,211,131, by Plyler, May 18, 1993, and U.S. Pat. No. 4,729,147, by Armbruster, Mar. 8. 1988, showing mechanical animal grooming devices that require the use of a human hand. The prior art does not teach on the use of a motivational means that would exhibit an irresistable incentive or attraction to an animal, whereby the animal would benefit from increased use of the device more often. The present invention takes advantage of the inherent instincts of an animal's response to a moving object, when the original movement of the object is not physically initiated by the animal, or human hand, but by the device. The prior art does not teach of combining an exercise, amusement, claw scratching, loose hair retention, and grooming device in one assembly, thereby eliminating the need to purchase one of each.

SUMMARY OF THE INVENTION

The present invention utilizes the phenomena of invisible or unseen forces of magnetic Fields. In the space around every permanent or electromagnet, there exists a force Field. A magnetic field is an example of the physical phenomenon known as a force Field, inherent in every electric charge, and in the gravitational field around every mass, electromagnet, and permanent magnet. The present invention employs an electro-mechanical and magnetic apparatus. Generally, the present invention is comprised of a circular housing, having a top or carpeted platform surface, a mounting surface For a motor, and a vertical orientated side surface, which also serves as a base. The housing Further includes a U-shaped lure ring surrounding the outside perimeter of the vertical orientated side surface. A motorized mechanism is concealed below the carpeted platform surface, comprised of a motor, motor output shaft, a sweep arm containing at least one permanent magnet at one end, possessing an inherent magnetic force field mounted at a right angle to the geared motor output shaft, further including the output shaft, extending sufficiently upward and exposed through the carpeted platform surface to accommodate a rubbing means or elongated brush mounted directly inline to the motor output shaft. The output shaft rotates one revolution clockwise and one revolution counterclockwise continuously. A motor reversing switch is activated by a cam affixed to the lowermost portion of the shaft output sweep arm, and the shaft output speed is preselected by a rheostat. The permanent magnet affixed at either end of the sweep arm causes a ball shaped lure containing a loose permanent magnet within its shell, to orbit back and forth within the partially exposed recess or cavity of the U-shaped ring. The U-shaped ring may be a permanent feature of the device or an accessory add-on feature. The lure ring may also contain a plain round ball, wherein the movement of the ball is initiated by the animal. A portion of the exposed recess or cavity of the U-shaped lure ring is sufficiently concealed with a cover to provide a hide and seek scenario of the lure ball. Predetermined output shaft speeds of one to 100 revolutions per minute may be preselected for a particular classification of animal, by adjusting an accessible potentiometer or rheostat mounted to the device.

It is therefore an object and advantage of the present invention to provide a combined mechanically assisted, animal amusement, entertainment, exercise, claw scratching, loose hair and animal body debris containment, and self grooming stimulator device, that does not require an animal or human hand to initiate movement of the grooming brush or ball shaped lure, thereby producing a synergistic effect.

Another object is that the rotatable brush would simulate the movement of a human hand when brushing an animal.

Another object is to combine mechanically assisted animal amusement, exercise, claw scratching, loose hair containment, and self grooming concepts into one device, thereby eliminating the need for multiple purchases of single use devices.

Another object is to have an animal expend its surplus energy more often, thereby developing improved muscle tone, alertness, coordination, a frequently groomed coat, and better sleeping habits.

Another object is that upon activation of the device, a cat will always respond to the activity presented by the device.

Another object is that the device would relieve the animal from boredom, by providing amusement, or gromming of itchy skin, thereby saving areas of household furniture from damage, loose hair, and soiling.

Another object is that an enticement to use a device, such as catnip, would no longer be required.

Another object is that the rubbing medium and claw scratching carpeted floor serve to contain loose animal hair and debris within the device, thereby protecting the living environment from unnecessary animal hair, body dirt, and claw damage.

Another object is that the motorized grooming device can be made suitable for any preselected classification of animal, such as domesticated animals, and animals in a zoo habitat.

Other objects and advantages may be readily determined by the following descriptions.

COMPLETE DESCRIPTION OF THE INVENTION

Figure 1A:
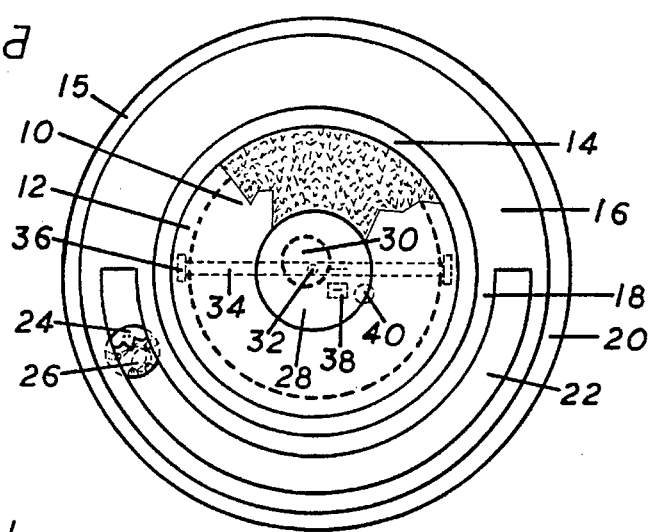
FIG. 1a is a plan top view of the present invention showing a circular enclosed housing concealing an electromechanical magnetic apparatus in hidden lines. Encircling the perimeter of the housing is a partially exposed U-shaped lure ring containing a ball.

FIG. 1a is a top plan view of the present invention showing the various components and their relative position to each other.

Figure 1B:
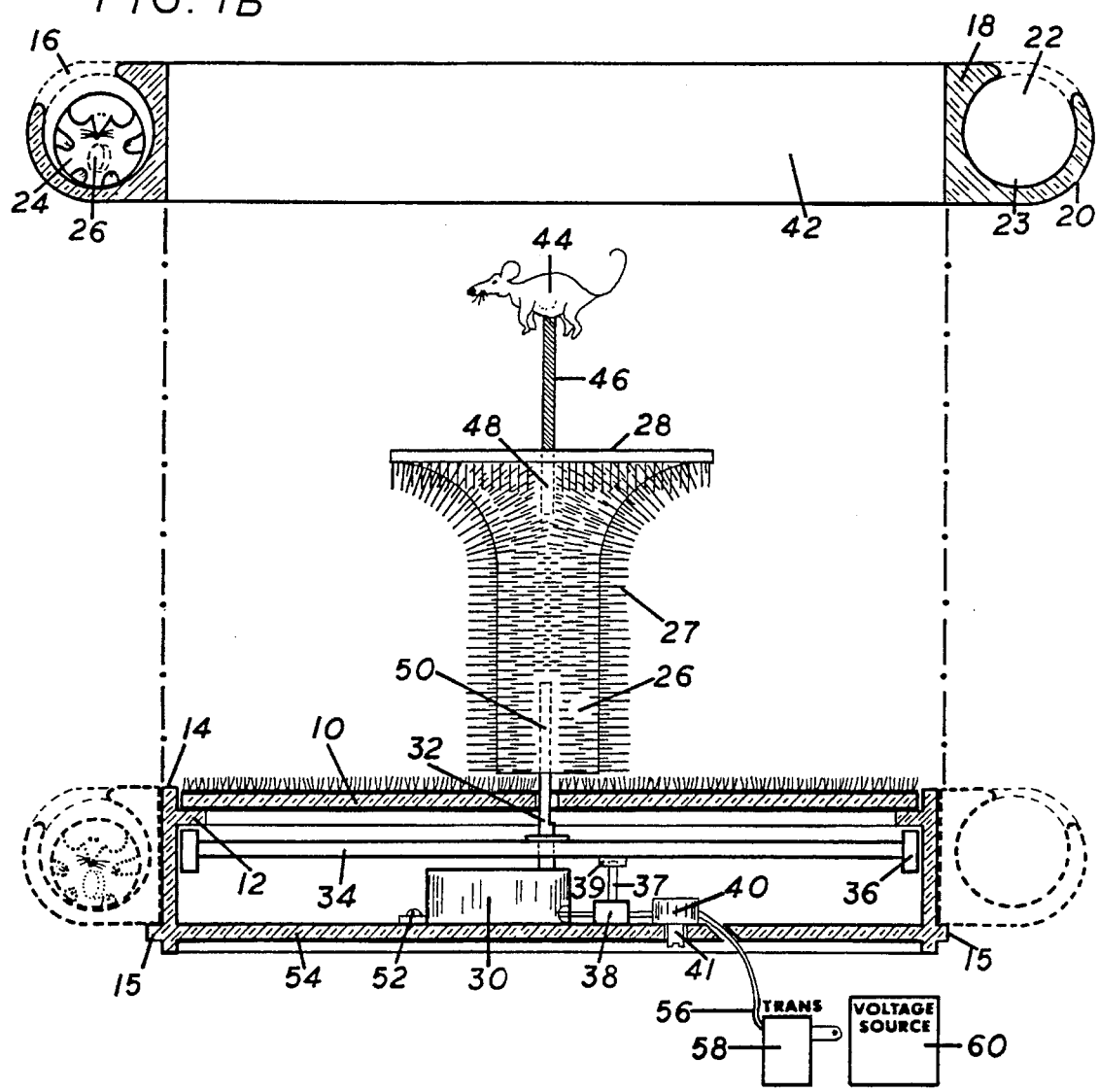
FIG. 1b is an exploded plan side view of a U-shaped lure ring and circular enclosed housing in cross section, displaying the component parts of an electromechanical magnetic apparatus and grooming brush. The U-shaped lure ring illustrated in hidden lines, shows its final position relative to the circular enclosed housing.

FIG. 1b is an exploded side plan view of the device housing and lure ring in cross section showing the various components and their relative positions to each other.

FIGS. 1a and 1b show a circular housing 14 comprised of a carpeted platform surface 10 for animal claw scratching and loose hair retention, supported by a circular mounting ledge 12. The lure ring body 42 is depicted as an add-on accessory (though it may be made permanent), and rests on circular positioning ring ledge 15 which is part of housing 14. The lure ring 42 is comprised of a closed circuit U-shaped trough or cavity 23 having a partial opening 22 exposing the interior of the U-shaped trough or cavity 23. A sufficient portion of the opening 22 has a cover 16 for concealment of a ball shaped lure 24 containing a loose secondary permanent magnet 26 within its shell. The ball shaped lure 24 is confined within the U-shaped trough or cavity 23 containment walls 18 and 20, and provides a hide and seek scenario for an animal when it orbits under the concealment cover 16 portion. A motorized mechanism is concealed below the carpeted platform surface 10 and is comprised of an internally geared motor fastened 52 to base 54, receiving electrical power from voltage source 60, via transformer/plug 58, through reduced voltage wiring 56, to an adjustable speed controlling rheostat 40, to motor reversing switch 38, and then to motor 30 producing predetermined revolutions per minute. The motor 30 is internally geared to motor output shaft 32, which in turn rotates a sweep arm 34 mounted at a right angle to output shaft 32, and rotates at a predetermined speed. The sweep arm 34 has a primary permanent magnet 36 affixed at both of its ends, and through interaction of the primary permanent magnet 36 possessing an inherent magnetic force field, and the secondary loose permanent magnet 26, within the lure ball 24 possessing a similar force field, an orbiting spin, and hop of the lure ball 24 takes place around the confines of the U-shaped ring 42. The motor output shaft 32 also extends upwards, and out through the carpeted platform surface 10, exposing a sufficient amount of shaft, having a partial flat surface, wherein it mates within the recessed opening 50, also having a flat spot shown in hidden lines for easy insertion or removal without the use of a set screw. The output shaft 32 rotates the circular rubbing medium or brush 27 at predetermined revolutions per minute. An adjustable speed controlling rheostat 40 is employed to provide a preselected RPM for the movable object, or lure ball 24, and the rubbing medium 27. The rheostat shaft 41 is accessible through the bottom of base 54, and is slotted for RPM adjustment with a screwdriver. A double pole, double throw motor reversing micro switch 38, located adjacent to the motor 30 provides one revolution clockwise, and one revolution counterclockwise of the movable object 24, and the rubbing medium 27 simultaneously. The motor reversing switch 38 is activated every revolution by a switch cam 39 permanently affixed to, and under sweep arm 34. The switch cam 39 contacts a thin flexible blade 37 of sufficient length, allowing the motor gear train to coast without passing the blade 37 before reversing rotation, thus avoiding gear shock and switch shock. An animal, such as a cat, can self groom with the grain, and against the grain of its coat every alternating revolution of the brushing medium 27, thereby insuring loose hair and body debris being removed and having its skin surface massaged. The rheostat 40 can be adjusted for the rubbing medium speed by a pet owner, more suitable to their animal. The rubbing medium 27 can be removed by lifting upwards from the output shaft 32 if simultaneous movement of the lure ball 24 and the rubbing medium 27 are not to be used for a particular reason. The exposed output shaft 32 should have a cover installed to protect an animal from injury. Obviously, different shaped rubbing mediums or brushes can be employed. The lure ball can also be removed if desired by pulling it through the restricting opening of the lure trough 22. The rheostat shaft 41 can be adjusted for higher output shaft speeds. Upon a thorough testing of applicant's prototype, output shaft speeds of one to 100 RPM revealed the following: the rubbing medium or brush rotational speeds between ten and twenty RPM seem to be the most satisfactory to cats. Movable object or lure ball orbiting speeds of one to five RPM produce a consistent spinning of the lure ball as it orbits the confines of the lure ring. Lure ball speeds of six to ten RPM produce an intermittent spin and slight hop movement. Lure ball speeds of between ten to thirty RPM seem to produce the wildest gyrations, combining various spinning rates and an extreme hopping of the lure ball which is particularly exciting to cats. The noticable hopping effect suggests making the lure ring confining recess, or cavity deeper, allowing more unrestricted height for the hopping event. Higher rotational speeds of the sweep arm with the brush removed, no longer moves the lure ball at a matching speed, but coaxes the lure ball to orbit about ten to twenty RPM by the reaction influence of the primary and secondary permanent magnet force fields and produces similar lure ball gyrations. On final analysis, the lure ball functions effectively at about the same RPM as the rubbing medium when used simultaneously. An accessory lure 44, affixed to a stiff flexible spring 46, and extending within recess 48 of brush top surface 28 provides an additional source of amusement for an animal. Combining animal amusement, exercise, grooming, and claw scratching features of good quality to one device eliminates the necessity of purchasing single purpose devices, thereby saving the consumer considerable expense.

Figure 2:
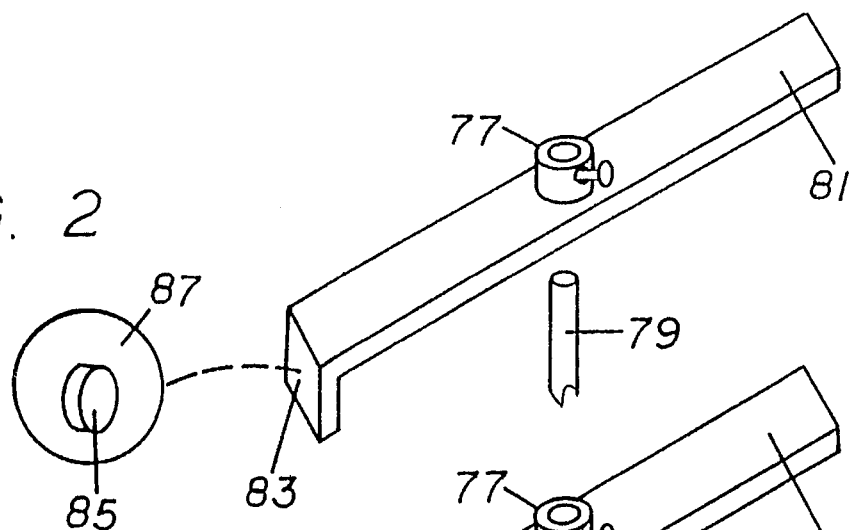
FIG. 2 is a perspective view of an alternate metallic sweep arm of FIGS. 1a and 1b, void of permanent magnets, and a magnet containing lure ball having a strong attraction to the metallic sweep arm.

FIG. 2 is a perspective view of an alternate metallic sweep arm 81, void of primary permanent magnets with a ninety degree bend 83 at one end, a cutaway portion of motor output shaft 79, and a shaft hub and set screw 77. The loose permanent magnet 85 within the non-metallic shell of the lure ball 87 is strongly attracted to the ninety degree bend 83 of the metallic sweep arm 81. This alternate eliminates several permanent magnets.

Figure 3:
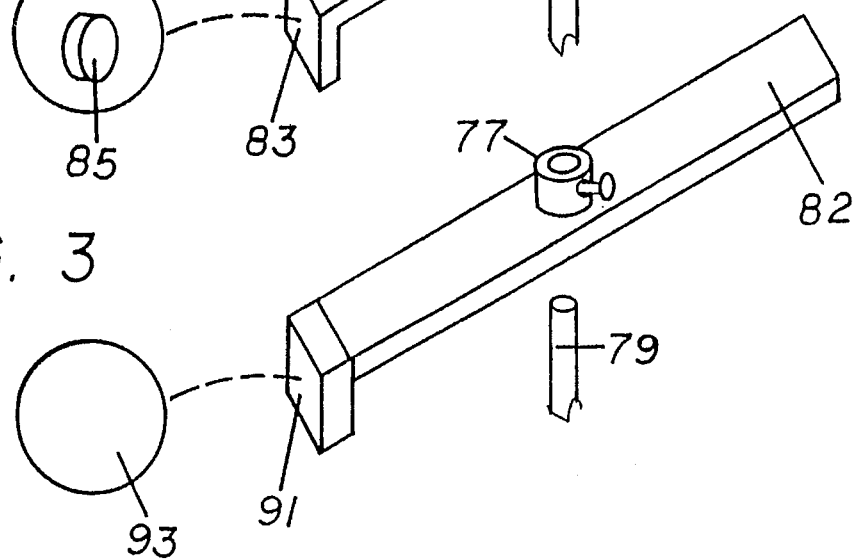
FIG. 3 is a perspective view of another alternate sweep arm of a preselected material, containing one permanent magnet affixed at one end, having a strong attraction to a thin metallic lure ball.

FIG. 3 is a perspective view of another alternate sweep arm 82 made of a preselected material with a permanent magnet 91 affixed to one end of sweep arm 81, a cutaway portion of motor shaft 79, and a shaft hub with set screw 77. The permanent magnet 91 is strongly attracted to a thin metallic lure ball 93. This alternate also eliminates several permanent magnets.

Figure 4:
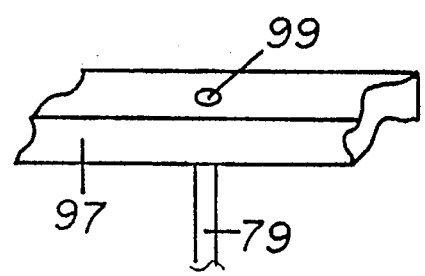
FIG. 4 shows a perspective view of still another alternate sweep arm comprised of a permanent bar magnet affixed directly to a cutaway view of a motor shaft.

FIG. 4 is a cutaway view in perspective of a permanent bar magnet 97 and typical mounting method, whereby it is press fitted or epoxy cemented to a cutaway portion of motor shaft 79. The permanent magnet 97 is strongly attracted to the thin metallic lure ball 93 of FIG. 3. This alternate employs a permanent magnet directly to the motor output shaft.

CONCLUSION

Thus it has been shown that the combined mechanically assisted animal amusement, claw scratching, exercise, and self grooming stimulator can perform all of the objectives as outlined above. Many other variations are possible. For example, it would be obvious to those already skilled in the art that may consider a ball shaped brush, or several brushes, or the use of sensors such as heat or motion to activate the device automatically, or electronic sound synthesizers. While the above descriptions may contain many specific details, these should not be construed as limitations on the scope of the invention, but rather as examples of embodiments or modifications, herein detailed in accordance with the descriptive requirements of law. It should be understood that the details are to be interpreted as illustrative and not in a limiting sense.

I claim:

1. A combined mechanically assisted exercise, amusement, self-grooming, and claw scratching device for animals comprising:
   a) a housing forming a base and having a lower surface, a vertically oriented peripheral sidewall extending from said lower surface, and an upper surface supported by said peripheral sidewall;
   b) a shaft extending through said upper surface of said housing;
   c) means for rotating said shaft disposed within said housing, said rotating means causing said shaft to rotate at a preselected rate of revolution;
   d) rubbing means directly coupled to said shaft and disposed above said upper surface of said housing;
   e) a continuous track encircling said vertically oriented peripheral sidewall, said continuous track having an open top to provide access to the interior thereof;
   f) an object disposed within said continuous track and freely movable therein; and
   g) means for producing a magnetic field coupled to said shaft and disposed within said housing, wherein rotation of said shaft causes said means for producing a magnetic field to rotate within said housing, the magnetic field produced thereby influencing said object to cause said object to move within said continuous track and orbit said housing.

2. The device of claim 1 wherein said housing is circular in cross-section and said continuous track comprises an annular ring.

3. The device of claim 1 wherein said means for rotating said shaft comprises an electric motor.

4. The device of claim 1 wherein said rubbing means comprises a brush having a rigid body coupled to said shaft and a plurality of bristles extending outwardly from said rigid body.

5. The device of claim 4 further comprising a lure, said lure being mounted to an upper end of said rigid body of said brush by a stiff spring such that said lure rotates in conjunction with said brush.

6. The device of claim 1 wherein said means for producing a magnetic field comprises an elongated arm mounted to said shaft at a right angle therewith and at least one permanent magnet affixed to an end of said arm remote from said shaft.

7. The device of claim 1 wherein said means for producing a magnetic field comprises a permanent magnet in the form of an elongated arm mounted to said shaft at a right angle therewith.

8. The device of claim 1 wherein said continuous track is removably attached to said housing.

9. The device of claim 1 further comprising speed controlling means connected to said means for rotating said shaft such that said shaft rotates at a rate of between one and one hundred rpm.

10. The device of claim 1 further comprising a reversing switch connected to said means for rotating said shaft such that the direction of rotation of said shaft may be selectively reversed.

11. The device of claim 1 wherein said movable object is a ball.

12. The device of claim 11 wherein said ball is formed of a metallic material.

13. The device of claim 11 wherein said ball is formed of a non-metallic material having a permanent magnet disposed therein.

14. The device of claim 13 wherein said ball is hollow and said permanent magnet is loosely confined within said hollow ball.

15. The device of claim 1 wherein said open top of said continuous track is partially covered so as to conceal a portion of the interior thereof.

16. The device of claim 1 wherein said upper surface of said housing includes means for permitting an animal to sink its claws therein and thus function as a scratching pad for the animal.

17. A combined mechanically assisted exercise, amusement, self-grooming, and claw scratching device for animals comprising:
   a) a circular housing forming a base and having a lower circular planar surface, a vertically oriented peripheral sidewall extending from said lower surface, and an upper circular planar surface supported by said peripheral sidewall, said upper surface of said housing including means for permitting an animal to sink its claws therein and thus function as a scratching pad for the animal;
   a shaft extending through said upper surface of said housing and having an upper and a lower end;
   c) a motor disposed within said housing and coupled to said lower end of said shaft;
   d) speed controlling means connected to said motor for causing said shaft to rotate at a preselected rate of revolution of between one and one hundred rpm;

e) a reversing switch connected to said motor for selectively reversing the direction of rotation of said motor;

f) brushing means directly coupled to said upper end of said shaft, said brushing means being disposed above said upper surface of said housing;

g) a lure mounted to an upper end of said brushing means such that said lure rotates in conjunction with said brushing means;

h) a continuous annular track encircling said vertically oriented peripheral sidewall, said continuous track having an open top to provide access to the interior thereof;

i) an object disposed within said continuous track and freely movable therein; and j) an elongated arm mounted to said shaft at a right angle therewith and disposed within said housing and at least one permanent magnet affixed to an end of said arm remote from said shaft for producing a magnetic field, wherein rotation of said shaft causes said arm and said at least one magnet attached thereto to rotate within said housing, the magnetic field produced thereby influencing said object to cause said object to move within said continuous track and orbit said housing.

18. The device of claim 17 wherein said movable object is a ball.

19. The device of claim 18 wherein said ball is formed of a metallic material.

20. The device of claim 18 wherein said hall is formed of a non-metallic material having a permanent magnet disposed therein.

* * * * *